(No Model.)

A. H. NOBLE.
Composition Button.

No. 235,277. Patented Dec. 7, 1880.

Witnesses:-

Inventor:-

United States Patent Office.

ALFRED H. NOBLE, OF NEW MILFORD, CONNECTICUT, ASSIGNOR TO NOBLE BROTHERS, OF SAME PLACE.

COMPOSITION BUTTON.

SPECIFICATION forming part of Letters Patent No. 235,277, dated December 7, 1880.

Application filed September 24, 1880. (No model.)

*To all whom it may concern:*

Be it known that I, ALFRED H. NOBLE, of New Milford, in the county of Litchfield and State of Connecticut, have invented a certain new and useful Improvement in Composition Buttons, of which the following is a specification.

The object of my invention is to provide a simple and inexpensive means whereby cloth shanks may be secured in buttons composed of plastic material or composition.

The invention consists in a button composed of a cloth shank, a metal collet having a hole through which the cloth shank projects, and a mass of plastic material or composition to form the body of the button pressed down upon the collet around the shank, and between the collet and the upper part of the shank, whereby the shank is held securely in place.

Figure 1:
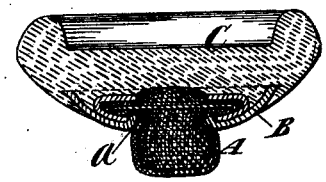
Figure 2:
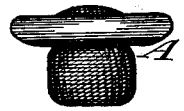
Figure 3:

In the accompanying drawings, Figure 1 represents a central section through a button made after my invention. Fig. 2 represents a side view of the cloth shank detached from other parts, and Fig. 3 represents a sectional view of the metal collet detached from other parts.

All the figures are drawn upon an enlarged scale for the sake of greater clearness.

A designates the shank of the button, which is made in the ordinary way, by gathering or folding a piece of cloth and crimping the edges of a metal disk down upon it.

B designates a metal collet, of concave or saucer shape, and having at its center a hole or aperture, $a$, of sufficient size to receive the cloth shank. After the cloth shank is inserted through the said hole or aperture $a$, the body of the button is formed by a mass, C, of material or composition in a plastic state, which is pressed down upon the collet B and around and under the metal disk or ring upon the inner end of the shank, thus securing the collet and shank securely in place.

In making these buttons I employ a two-part mold, one part of which gives form to the front of the button, and the other part to the back thereof. In the part of the mold which gives form to the back of the button is a recess to receive the metal collet B, and a hole for the reception of the part of the shank which projects beyond the metal collet. The plastic material or composition is then pressed tightly down upon the metal collet B, and between the upper part of the shank and said collet, and after the material or composition has become sufficiently hardened the shank is securely held in place.

What I claim as my invention, and desire to secure by Letters Patent, is—

A button composed of a cloth shank, a metal collet having a central hole or aperture through which the shank projects, and a mass of plastic material or composition pressed down upon the collet around the shank, and between the upper part of the shank and the collet, and forming the body of the button, substantially as herein specified.

ALFRED H. NOBLE.

Witnesses:
JOHN M. BENEDICT,
EBENEZER PLACKETT.